Patented Apr. 19, 1932

1,854,896

UNITED STATES PATENT OFFICE

ALPHONSE GAMS AND GUSTAVE WIDMER, OF BASEL, SWITZERLAND, ASSIGNORS TO THE FIRM SOCIETY OF CHEMICAL INDUSTRY IN BASLE, OF BASEL, SWITZERLAND

CONDENSATION PRODUCTS OF FORMALDEHYDE AND CARBAMIDES AND IN THE PROCESS OF MAKING SAME

No Drawing. Application filed July 14, 1927, Serial No. 205,839, and in Switzerland August 11, 1926.

Our invention relates to the manufacture of clear condensation products of formaldehyde and carbamides, particularly mixtures of thiourea and urea. It comprises the process of manufacture of these condensation products, the new products themselves, as well as the application of the same in the industry of artificial materials.

In the manufacture of clear condensation products by reaction of urea with formaldehyde whether in presence or absence of a catalyst and evaporating the solution thus obtained, there have always been used at least 2 molecules of formaldehyde to 1 molecule of urea. It is known that the products which contain more than 2 molecules of formaldehyde to 1 molecule of urea have the disadvantage that in spite of precautions they scarcely ever harden free from faults, generally suffering from formation of bubbles or from disadvantageous strains in the hardened state.

In our American application Serial No. 88,916, filed February 17th, 1926 which has matured into Patent 1,718,901, there is described a process which makes it possible to use a smaller proportion of formaldehyde than is represented by the ratio of 2 molecules of formaldehyde to 1 molecule of ura. However, in this process also the production of clear products requires somewhat narrowly limited conditions. When there is an essential departure from the ratio 2:1, the mass obtained is no longer glassy, but milky and even like porcelain.

Another known process consists in first condensing urea and its derivatives with formaldehyde by heating for a short while, then adding thiourea or urea and heating the whole in an acid medium until on cooling the reaction liquid a resin precipitates from the solution (see Australian Patent No. 999). In this process the total quantity of urea, or of urea and thiourea, used for the formation of the resin has been in excess of one molecular proportion of the carbamide component for each two molecular proportions of formaldehyde.

By the present invention clear condensation products from urea, thiourea and formaldehyde may be obtained with still smaller proportions of formaldehyde than have been used hitherto.

According to this process aqueous formaldehyde is condensed with a quantity of urea not greater than corresponding to 1 molecular proportion for each two molecules of formaldehyde at a temperature of about 100° C. up to the stage at which a sample of the reaction mixture yields a precipitate on dilution with water, then thiourea is added in such a proportion that the total quantity of urea and thiourea present in the mixture amounts to at least 1 molecular proportion for each 1.6 molecular proportion of formaldehyde, whereupon the mixture is concentrated and the residue hardened in the usual manner.

Instead of urea in the first phase of condensation of course also mixtures of urea and thiourea conveniently containing a preponderant proportion of urea, and instead of thiourea in the second phase of condensation also mixtures of thioura and urea conveniently containing a preponderant proportion of thiourea may be employed, without altering the result of the present process. These modifications are thus considered as lying within the scope of the present invention.

By conducting the condensation in this manner clear products may be obtained even if the molecular proportion of urea and thiourea to formaldehyde is as high as 1:1.

The process may also be carried out in a single phase, i. e. by condensing aqueous formaldehyde with a quantity of thiourea and urea not less than that represented by 1 molecular proportion of thiourea and urea to 1.6 molecular proportions of formaldehyde at a temperature of about 100° C. up to the stage at which a sample of the solution yields a precipitate on dilution with water, then concentrating the solution and hardening the residue in the usual manner.

The relative proportion of urea to thiourea may vary within wide limits. Preferably the proportion of thiourea is increased with decreasing proportions of formaldehyde. However, clear products are in any case obtained also with combinations of thiourea and urea containing less than corresponds to the proportion by weight of thiourea to urea ¾ : ¼.

The condensation may be conducted either in presence or absence of a condensing agent or catalyst.

By the term "formaldehyde" also the polymers of formaldehyde and by the terms "thiourea" and "urea" also the substitution products of these latter are understood.

The advantage of the invention resides in the diminished consumption of formaldehyde accompanied by greater elasticity of conditions for producing glassy products. Moreover, the new products are technically preferable to those obtained by the known processes. Owing to the very small viscosity of the solution formed during the condensation the water is readily separated therefrom by distillation, so that products which are nearly destitute of water and therefore of very stable form are obtained. A further advantage of the new products is that they are workable free from odour, whereas the known products made from a larger proportion of formaldehyde always evolve a more or less strong odour of formaldehyde when worked.

The following examples illustrate the invention, the parts being by weight:—

Example 1

76 parts (1 molecule) of thiourea and 30 parts (½ molecule) of urea are dissolved in 167 parts of formaldehyde solution of 36 per cent. strength (2 molecules) and the solution is mixed with 15 parts of blood-charcoal and then filtered. The clear solution is boiled for about 4 hours in a reflux apparatus on the water-bath. The condensation solution, clear as crystal, thus produced, which yields a precipitate in shreds on addition of water and alcohol, remains quite clear on cooling. It may be hardened in the usual manner by concentration, addition of a catalyst and heating, that is to say it may be converted into solid transparent polymerization products.

Example 2

250 parts of urea are dissolved in 685 parts of formaldehyde of 36.6 per cent. strength. The solution is mixed with 35 parts of blood-charcoal and the whole is filtered until clear. The filtrate is now condensed by stirring it in an autoclave for seven hours at 98° C. The product is colourless, yields a precipitate with water and alcohol and is quite feebly acid. It is mixed with 75 parts of pure pulverized thiourea and concentrated at a low temperature in a vacuum to form a syrup. There are then added 0.25 part of ammonium sulphocyanide dissolved in a little water; further concentration follows and the mass is then cast. The cast mass promptly polymerizes when gently warmed, yielding products as clear as crystal which can be worked in an excellent manner and do not smell of formaldehyde during the operation.

Example 3

250 parts of urea are dissolved in 833 parts of formaldehyde of 30 per cent. strength which has been neutralized; the solution is filtered and boiled in a reflux apparatus until it begins to yield a precipitate on addition of water. There are then dissolved in this condensation product 150 parts of thiourea and 0.5 part of ammonium sulphocyanide; the solution is evaporated at a low temperature to a syrup and cast into moulds. It is similar to the product obtained as described in Example 1.

Example 4

250 parts of urea are dissolved in 715 parts of formaldehyde of 35 per cent. strength, obtained by subliming paraformaldehyde in water, and the solution is condensed at 105° C. in an autoclave having a stirrer until the product begins to be precipitated on addition of water. In the condensation product thus obtained are dissolved 23 parts of urea, 60 parts of thiourea and 0.5 part of ammonium sulphocyanide, the solution is evaporated to a syrup and then cast. The products are clear and stable, and similar to those obtained as described in Example 1.

Example 5

120 parts of urea and 334 parts of formaldehyde of 36 per cent. strength which has been neutralized are boiled together in a reflux apparatus until the product begins to yield a precipitate with water. To the condensation product thus obtained there are added 152 parts of thiourea, 50 parts of water and 0.24 parts of a catalyst of strong action, for instance ammonium sulphate or ammonium sulphocyanide. The solution obtained is concentrated and then cast in the form of a thick magma. During the hardening operation the mass becomes quite clear and by the time it is polymerized it is transparent and clear.

What we claim is:—

1. A process for the manufacture of clear synthetic resins by condensing formaldehyde with a quantity of urea not greater than that corresponding to 1 molecular proportion of urea for each 2 molecular proportions of formaldehyde at a temperature of about 100° C. up to the stage at which a sample of the reaction mixture yields a precipitate on dilution with water, then adding thiourea in such a quantity that the total quantity of urea and thiourea present in the mixture amounts to not less than 1 molecular proportion for each 1.6 molecular proportions of formaldehyde, and finally evaporating the solution of the condensation product and hardening the residue in the usual manner.

2. A process for the manufacture of clear synthetic resins by condensing aqueous formaldehyde with a quantity of thiourea and urea not less than that represented by 1 molecular proportion of urea and thiourea to 1.6 molecular proporions of formaldehyde at a temperature of about 100° C. up to the stage at which a sample of the solution yields a precipitate on dilution with water, then evaporating the solution of the condensation product and hardening the residue in the usual manner.

3. As new articles of manufacture, useful as synthetic resins, clear condensation products of formaldehyde, thiourea and urea, which contain in their molecule the constituents of not more than 1.6 molecules of formaldehyde for 1 molecule of the mixture of thiourea and urea employed and which are obtained by condensing formaldehyde with a quantity of urea not greater than that corresponding to 1 molecular proportion of urea for each 2 molecular proportions of formaldehyde, at a temperature of about 100° C. till the solution shows hydrophobe characterisics, then adding thiourea in such a quantity that the total quantity of urea and thiourea present in the mixture amounts to not less than 1 molecular proportion for each 1.6 molecular proportions of formaldehyde, and finally, evaporating the solution of the condensation product and hardening the residue in the usual manner, the new products constituting glasslike bodies of high stability which may be worked in an excellent manner and without evolving any odour of formaldehyde while worked.

4. As new articles of manufacture, useful as synthetic resins, clear condensation products of formaldehyde, thiourea and urea, which contain in their molecule the constituents of 1 molecule of formaldehyde for 1 molecule of the mixture of thiourea and urea the new products constituting glasslike bodies of high stability which may be worked in an excellent manner and without evolving any odour of formaldehyde while worked.

5. A process for the manufacture of clear synthetic resins by condensing formaldehyde with a quantity of urea not greater than that corresponding to 1 molecular proportion of urea for each 2 molecular proportions of formaldehyde at a temperature of about 100° C. till the solution shows hydrophobe characteristics, then adding thiourea in such a quantity that the total quantity of urea and thiourea present in the mixture amounts to not less than 1 molecular proportion for each 1.6 molecular proportions of formaldehyde, and finally evaporating the solution of the condensation product and hardening the residue in the usual manner.

6. A process for the manufacture of clear synthetic resins by condensing aqueous formaldehyde with a quantity of thiourea and urea not less than that represented by 1 molecular proportion of urea and thiourea to 1.6 molecular proportions of formaldehyde at a temperature of about 100° C. till the solution shows hydrophobe characteristics, then evaporating the solution of the condensation product and hardening the residue in the usual manner.

7. As new articles of manufacture, useful as synthetic resins, clear condensation products of formaldehyde, thiourea and urea, which contain in their molecule the constituents of not more than 1.6 molecules of formaldehyde for 1 molecule of the mixture of thiourea and urea employed and which are obtained by condensing aqueous formaldehyde with a quantity of thiourea and urea not less than that represented by 1 molecular proportion of urea and thiourea to 1.6 molecular proportions of formaldehyde at a temperature of about 100° C. till the solution shows hydrophobe characteristics, then evaporating the solution of the condensation product and hardening the residue in the usual manner, the new products constituting glasslike bodies of high stability which may be worked in an excellent manner and without evolving any odour of formaldehyde while worked.

In witness whereof we have hereunto signed our names this 5th day of July 1927.

ALPHONSE GAMS.
GUSTAVE WIDMER.